United States Patent [19]

Johnson et al.

[11] 4,229,260
[45] Oct. 21, 1980

[54] NUCLEAR REACTOR FUEL ELEMENT

[75] Inventors: Carl E. Johnson, Elk Grove, Ill.; Carl E. Crouthamel, Richland, Wash.

[73] Assignee: The United States of America as represented by the United States Department of Energy, Washington, D.C.

[21] Appl. No.: 692,161

[22] Filed: Jun. 2, 1976

Related U.S. Application Data

[63] Continuation of Ser. No. 499,958, Aug. 23, 1974, abandoned.

[51] Int. Cl.² .............................................. G21C 3/20
[52] U.S. Cl. ..................................................... 176/82
[58] Field of Search .................. 176/67, 68, 82, 91 R, 176/91 SP, 73, 74

[56] References Cited
U.S. PATENT DOCUMENTS

| | | | |
|---|---|---|---|
| 3,088,892 | 5/1963 | Cain et al. | 176/91 SP |
| 3,189,101 | 6/1965 | Blake | 176/73 |
| 3,192,621 | 7/1965 | Bauer et al. | 176/73 |
| 3,212,988 | 10/1965 | Ringot | 176/67 |
| 3,227,622 | 1/1966 | White | 176/74 |
| 3,230,150 | 1/1966 | Martin et al. | 176/82 |
| 3,288,636 | 11/1966 | Straubwasser | 176/82 |
| 3,347,749 | 10/1967 | Jordan | 176/68 |

FOREIGN PATENT DOCUMENTS 933550  8/1963  United Kingdom ................ 176/91 SP

OTHER PUBLICATIONS

ANL-RDP-19, (8/73), pp. 5.12-5.14, Sachs et al.
PMC-74-01, (1/25/74), pp. 86-88.
AEC Report, NYO-9187, p. 99.

Primary Examiner—S. A. Cangialosi
Attorney, Agent, or Firm—James E. Denny; Walter L. Rees; Jerold B. Schnayer

[57] ABSTRACT

A nuclear reactor fuel element is described which has an outer cladding, a central core of fissionable or mixed fissionable and fertile fuel material and a layer of oxygen gettering material on the inner surface of the cladding. The gettering material reacts with oxygen released by the fissionable material during irradiation of the core thereby preventing the oxygen from reacting with and corroding the cladding. Also described is an improved method for coating the inner surface of the cladding with a layer of gettering material.

7 Claims, 1 Drawing Figure

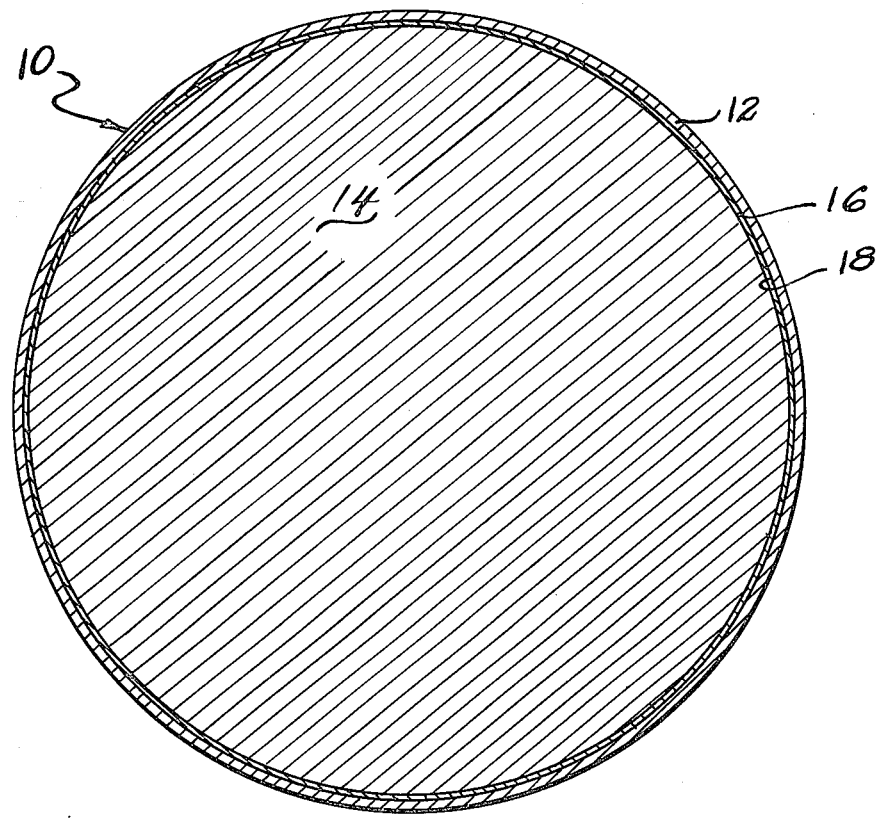

NUCLEAR REACTOR FUEL ELEMENT

CONTRACTUAL ORIGIN OF THE INVENTION

The invention described herein was made in the course of, or under, a contract with the UNITED STATES ATOMIC ENERGY COMMISSION.

This is a continuation of application Ser. No. 499,958 filed Aug. 23, 1974, now abandoned.

BACKGROUND OF THE INVENTION

This invention relates to a nuclear reactor fuel element. More specifically this invention relates to a nuclear reactor fuel element having a layer of oxygen gettering material on the inside surface of the cladding. This invention also relates to an improved method for coating the inner surface of the cladding with a layer of oxygen gettering material.

A continuing supply of fissionable material is necessary to fuel future nuclear power plants to ensure adequate electrical power to meet the needs of the future. At present, power reactors are fueled with fissionable uranium-235 of which only a limited supply is available. To overcome this shortage of fissionable material, "breeder" power reactors are being developed, which produce more new fissionable material than consumed in sustaining the reaction. For example, fissionable $^{233}U$ or $^{239}Pu$ is bred from fertile $^{232}Th$ or $^{238}U$ which is relatively abundant.

Because of their desirable physical characteristics, a reactor fuel of mixed plutonium and uranium oxides is being considered to fuel the breeder reactors presently under development. However, several problems have been discovered which are associated with the use of the mixed oxides. For example, it has been found that mixed oxide fuels are far more oxidizing than uranium oxide when used alone as a fuel. This oxidizing power is also known as the oxygen potential and is a measure of the driving force for the numerous reactions which take place in the fuel element during irradiation. Among other problems, this oxidizing potential provides the chemical driving force for corrosive attack of the fuel element cladding, controls the vapor pressure of many fuel components, especially that of the uranium oxides and thus redistribution of uranium in the mixed oxide fuel matrix, controls the chemical state of many fission products, their interaction with the fuel contributes to fuel swelling, volatility and redistribution.

A particular problem has been the attack by the oxygen upon the fuel element cladding. Two types of cladding attack have been observed at the fuel-cladding interface. One is a general recession of the cladding thickness by a uniform oxidation of the stainless steel. The second is intergranular penetration by oxygen and fission products along grain boundaries in the cladding. The fission products cesium, molybdenum, tellurium and iodine are also significant factors in influencing the degree and type of cladding attack.

SUMMARY OF THE INVENTION

A nuclear reactor-fuel element has been prepared which eliminates many of the problems associated with the oxygen potential of the fuel material. The fuel element of this invention has a metallic cladding, a layer of oxygen gettering material on the inner surface of the cladding and a central core of an actinide oxide which may be fissionable or mixed fissionalbe and fertile fuel material. The oxygen released during fission reacts with the gettering material and forms an oxide coating on the surface of the gettering material which protects the cladding by preventing the oxygen from reacting with and corroding the cladding material. Another advantage of the use of a layer of gettering material on the inner surface of the cladding is the formation of a ternary getter-oxygen-cesium compound on the surface of the getter material which acts as a lubricant to reduce fuel-cladding mechanical interaction that restricts the axial movement of the fuel within the cladding.

An improvement has also been made in the method for coating the oxygen gettering material on the inner surface of the cladding whereby the gettering material has a very low carbon concentration. This is important to prevent reaction by the carbon with either the gettering material or with the cladding.

In the previous method for coating a metal substrate, the substrate is uniformly heated to approximately 400 to 450° C. while a volatile compound of the coating metal is heated to vaporize the compound and mixed with a heated inert gas to form a vapor-inert gas mixture. The mixture is then passed over the heated substrate whereby the vapor of the compound is decomposed and deposits the metal upon the heated substrate. The improvement in the method consists of adding 2 to 10 volume percent hydrogen gas to the heated inert gas whereby the hydrogen reacts with any carbon released during decomposition of the vaporized compound to form $CH_4$ which is carried from the substrate by the inert gas, thereby forming a metal coating having very low carbon impurities.

It is therefore one object of this invention to provide a nuclear reactor fuel element in which the cladding material is protected from corrosion by oxygen.

It is a further object of this invention to provide a nuclear reactor fuel element in which the inner surface of the cladding material is protected from corrosion by oxygen which is released during irradiation of the element.

It is still another object of the invention to provide a nuclear reactor fuel element in which the inner surface of the cladding contains a layer of oxygen gettering material.

It is still another object of the invention to provide a method for providing a layer of oxygen gettering material on a substrate.

Finally, it is the object of this invention to provide a method for coating a layer of oxygen gettering material having a low carbon content on a metal substrate.

BRIEF DESCRIPTION OF THE DRAWING

The FIGURE is a cross-sectional view of the fuel element of the invention.

DETAILED DESCRIPTION OF THE INVENTION

Turning first to the FIGURE, there is shown fuel element 10 having an over cladding 12, a central fuel core 14 and coating 16 of oxygen gettering material on the inner surface 18 of cladding 12.

The cladding may be of any suitable metal or alloy but, in general, an austenitic stainless steel such as 304 or 316 stainless is preferred. It is also preferred that the cladding be approximately 10 to 15 mils in thickness.

The oxygen gettering material which forms the layer on the inner surface of the cladding must be a material which will react chemically with the oxygen formed in the fuel element and yet not release the oxygen under the conditions at which the fuel element must operate to prevent the oxygen from reacting with the cladding material. In general, chromium has been found to be the preferred gettering materials. The layer of chromium may range in thickness from approximately 0.5 to 1.0 mil.

The fuel core may be a single actinide compound or it may be a combination of actinide compounds such as for example plutonium oxide, uranium oxide or thorium oxide. The exact proportions of the actinide materials in the fuel core will be determined by the operating characteristics of the particular nuclear reactor involved and do not form any part of the present invention. The fuel core generally consists of pellets of small right circular cylinders, inserted in a tube of cladding material and sealed.

The inner surface of the cladding material can be provided with a layer of oxygen gettering material by any method known to those skilled in the art. One method found to be satisfactory is vapor deposition of the gettering metal on the inner surface of the cladding tube by thermally vaporizing a compound of the metal in the presence of an inert gas and passing the compound-vapor-inert gas mixture through the center of the cladding tube which is evenly heated, the compound decomposing upon contact with the hot substrate material. The particular compound chosen for the thermal decomposition should be sufficiently volatile to be vaporized conveniently into an inert gas stream at a reasonable temperature, for example, below 250° C., yet the compound should be thermodynamically stable at the vaporization temperature and unstable at higher temperatures to enable the compound's decomposition and the metal's deposition.

A specific compound which meets the above requirements is dicumene chromium (DCC) $Cr[C_6H_5CH(CH_3)_2]_2$ although other possible compounds include chromium iodide and chromium carbonyl. While deposition of chromium by thermal decomposition has been utilized previously for placing a layer of chromium on the surfaces of a substrate, the layer of chromium contained more carbon than was compatible for the inside of a nuclear reactor fuel element. Therefore, the present method was developed which lowers the carbon content in the gettering layer to only a few ppm and consists in adding approximately 2 to 10 volume % hydrogen to the inert gas stream whereby any free carbon formed by decomposition of the metal compound will react with the hydrogen to form methane ($CH_4$) which will be swept from the surface of the substrate by the passage of the gasses therethrough. This process can best be described by the following specific example.

The DCC was heated to approximately 200° C. with argon gas containing approximately 5% hydrogen flowing across the top of the DCC bed at about 4000 cc/min at a temperature of approximately 325° C. The DCC vapor was asperated into and mixed with the Ar-5% $H_2$ gas and this gas mixture was then passed at normal pressure through the center of a 316 stainless steel tube 14″ long having a ¼″ interior diameter with walls about 15 mil thick. The tube was uniformly heated throughout its entire length to approximately 425° C. by resistive heating. This procedure was followed for 3–5 hours, after which the tube was permitted to cool and was examined. The interior of the cladding was found to have an even chromium coating which was approximately 1 mil in thickness. Upon chemical analysis the coating was found to contain about 300 ppm of carbon which is within the allowable tolerances for the interior of the fuel element.

The hydrogen content of the inert gas may vary from about 2 to about 10%. It is necessary that sufficient hydrogen be present in the system to react with the free carbon as it is formed by decomposition of the dicumene to form $CH_4$ which is then swept from the system. A concentration greater than about 10% hydrogen is unnecessary and may present problems in preventing combustion within the system.

The argon-hydrogen gas mixture may be heated from about 300° to 350° C. for the best results. It is important that the cladding tube be heated uniformly throughout its full length to obtain a uniform coating of chromium. The temperature of the cladding may range from about 400° C. to 450° C. to obtain the best results. It should be noted that the temperature of the cladding should not go below 380° C. for at temperatures below 380° C. the chromium deposited on the cladding wall will contain organic contaminants.

After the inner surface of the cladding tube has been coated with oxygen gettering material, the tube may be filled with nuclear reactor fuel material such as, for example, a mixture of plutonium oxide and uranium oxide in the form of ¼″ right circular cylinders, the ends can be sealed and the fuel rod is ready for insertion in a fuel assembly which can then be inserted into a nuclear reactor.

It will be understood that the invention is not to be limited to the details given herein but that it may be modified within the scope of the appended claims.

The embodiments of the invention in which an exclusive property or privilege is claimed are defined as follows:

1. A nuclear reactor fuel element comprising:
   a tubular-shaped outer metallic cladding having an inner surface and sealed ends;
   a layer of chromium bonded to the inner surface of the cladding to form an integral member, said chromium acting as an oxygen getter to protect the cladding from corrosion;
   a central core of actinide fuel material disposed within the cladding, said core being movable relative to the cladding.

2. The fuel element of claim 1 wherein the chromium layer is 0.5 to 1.0 mils thick.

3. The fuel element of claim 2 wherein the cladding is stainless steel.

4. The fuel element of claim 3 wherein the cladding walls are 10 to 15 mils thick.

5. The fuel element of claim 4 wherein the actinide fuel material is selected from the group consisting of plutonium oxide, uranium oxide, plutonium oxide and uranium oxide, and plutonium oxide and thorium oxide.

6. The fuel element of claim 5 wherein the core of actinide fuel material consists of a plurality of right circular cylinders.

7. The fuel element of claim 6 wherein the cladding is a tube having a ¼″ interior diameter and walls 15 mils thick, the chromium layer is about 1 mil thick and the actinide fuel material is a mixture of plutonium oxide and uranium oxide in the form of ¼″ right circular cylinders.

* * * * *